United States Patent
Sun et al.

(10) Patent No.: US 12,250,258 B2
(45) Date of Patent: Mar. 11, 2025

(54) OPTIMIZED MODEL TRANSMISSION

(71) Applicant: Telefonaktiebolaget LM Ericsson (publ), Stockholm (SE)

(72) Inventors: Bin Sun, Luleå (SE); Yifei Jin, Solna (SE); Rafia Inam, Västerås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 201 days.

(21) Appl. No.: 17/918,241

(22) PCT Filed: May 12, 2020

(86) PCT No.: PCT/EP2020/063190
§ 371 (c)(1),
(2) Date: Oct. 11, 2022

(87) PCT Pub. No.: WO2021/228373
PCT Pub. Date: Nov. 18, 2021

(65) Prior Publication Data
US 2023/0148106 A1  May 11, 2023

(51) Int. Cl.
| | |
|---|---|
| H04L 65/752 | (2022.01) |
| H04L 67/14 | (2022.01) |
| H04W 28/08 | (2023.01) |

(52) U.S. Cl.
CPC ............ *H04L 65/752* (2022.05); *H04L 67/14* (2013.01); *H04W 28/0925* (2020.05); *H04W 28/0967* (2020.05)

(58) Field of Classification Search
CPC ......... H04L 65/752; H04L 9/40; H04L 65/75; H04L 65/756; H04L 67/14; H04W 28/0925; H04W 28/0967
See application file for complete search history.

(56) References Cited

U.S. PATENT DOCUMENTS 9,491,498 B2 * 11/2016 Brooks ............ H04N 21/26216
2004/0233866 A1 * 11/2004 Bossoli ............... H04L 65/1104
370/328

(Continued)

FOREIGN PATENT DOCUMENTS

| CN | 107566383 A | 1/2018 |
| CN | 108632764 A | 10/2018 |

(Continued)

OTHER PUBLICATIONS

SA WG1, "New WID on Study on traffic characteristics and performance requirements for AI/ML model transfer in 5GS (from S1-193606)", 3GPP TSG SA Meeting #86, Sitges, Spain, Dec. 10, 2019, pp. 1-3, SP-191040, 3GPP.

(Continued)

*Primary Examiner* — Nicholas R Taylor
*Assistant Examiner* — Angela Widhalm De Rodriguez
(74) *Attorney, Agent, or Firm* — COATS & BENNETT, PLLC (57) ABSTRACT

The invention relates to a method for operating a policy control entity in a cellular network, the method comprising: —determining a quality of service parameter for a data packet session in which one trained model from a plurality of trained models is downloaded to a mobile entity, —determining at least one capacity parameter of the mobile entity, —determining a network transmission parameter of the cellular network, —determining said one trained model from the plurality of different trained models based on a dataset which maps different capacity parameters and transmission capabilities to the plurality of trained models, on the determined capacity parameter, and on the network transmission parameter, —determining routing information indicating where said one trained model is accessible for a transmission to the mobile entity, —transmitting the routing (Continued)

information to a session management entity configured to manage the data packet session in the cellular network.

12 Claims, 8 Drawing Sheets

(56) References Cited

U.S. PATENT DOCUMENTS

| | | | |
|---|---|---|---|
| 2007/0011334 A1* | 1/2007 | Higgins | G06F 11/3604 |
| | | | 709/227 |
| 2018/0027060 A1* | 1/2018 | Metsch | G06F 12/109 |
| 2019/0294998 A1 | 9/2019 | Kloepper et al. | |
| 2019/0340524 A1* | 11/2019 | Kirchhoff | G06F 8/10 |
| 2020/0356415 A1* | 11/2020 | Goli | G06N 20/00 |
| 2021/0329496 A1* | 10/2021 | Koodli | H04W 28/082 |

FOREIGN PATENT DOCUMENTS

| | | |
|---|---|---|
| JP | 2012039198 A | 2/2012 |
| KR | 20090032292 A | 4/2009 |

OTHER PUBLICATIONS

Challita, U. et al., "When machine Learning Meetings Wireless Cellular Networks: Deployment, Challenges, and Applications", IEEE Communications Magazine, vol. 58 No. 6, Jun. 1, 2020, pp. 12-18, IEEE.

\* cited by examiner

| Features/Parts | Original Type & Range | Importance Level (usually can have 3-5 levels) |
|---|---|---|
| Feature 1 | 32bit Int (5-60) | Important |
| Model Part 3 | 32bit Float | Non-important |

FIG. 3

| Importance Level | Network Status (usually can have 3-5 levels) | UE Capability | Original Type | Changed Type / Range | Actions |
|---|---|---|---|---|---|
| Important | Good (e.g. throughput >10Mb & delay <300ms) | Good | Int | No | Transfer as it is. |
| | | Good | Float | No | Transfer as it is. |
| | | Bad | Int | No | Transfer as it is. |
| | | | Float | Min-max to 16-bit int | Transfer 16 bits. |
| | Poor (e.g. throughput <10Mb or delay >300ms) | Good | Int | Min-max to 16-bit int | Transfer 16 bits. |
| | | Good | Float | Min-max to 16-bit int | Transfer 16 bits. |
| | | Bad | Int | Min-max to 16-bit int | Transfer 16 bits. |
| | | | Float | Min-max to 8-bit int | Transfer 8 bits. |
| Non-important | Good (e.g. throughput >10Mb & delay <300ms) | Good | Int | Min-max to 16-bit int | Transfer 16 bits. |
| | | Good | Float | Min-max to 8-bit int | Transfer 8 bits. |
| | | Bad | Int | Min-max to 8-bit int | Transfer 4 bits. |
| | | | Float | No. | No Transfer. |
| | Poor (e.g. throughput <10Mb or delay >300ms) | Good | Int | Min-max to 8-bit int | Transfer 4 bits. |
| | | Good | Float | No. | No Transfer. |
| | | Bad | Int | No. | No Transfer. |
| | | | Float | No. | No Transfer. |
| ... | ... | | ... | ... | ... |

OPTIMIZED MODEL TRANSMISSION

TECHNICAL FIELD

The present application relates to a method for operating a policy control entity in a cellular network. Furthermore, the corresponding policy control entity is provided. Additionally, a method for operating a user plane entity is provided configured to handle a data packet session and the corresponding user plane entity itself. In addition, a system comprising the policy control entity and the user plane entity is provided. Furthermore, a computer program comprising program code and a carrier comprising the computer program is provided.

BACKGROUND

Many applications using machine learning/deep learning models require real-time data transfer to be used by the model. Transferring this data through a cellular network to a user entity might slow down the process. Specially, for real-time applications it is very crucial to transfer the data very quickly.

Further, for applications like Google Translate offline instant camera translation, the models of different languages need to be downloaded on the user devices or mobile entities UEs (cell phones) in real time. These models should be small in size to not only meet the requirement of data-transfer in real-time but also meet the need of utilizing less resources of the UEs. Another example is autonomous vehicles identifying the traffic sign boards in real-time. For both applications, beyond highly sensitive to communication throughput, the application server (in the user plane) is required to decide the model size based on the network control plane information.

Figure 1:
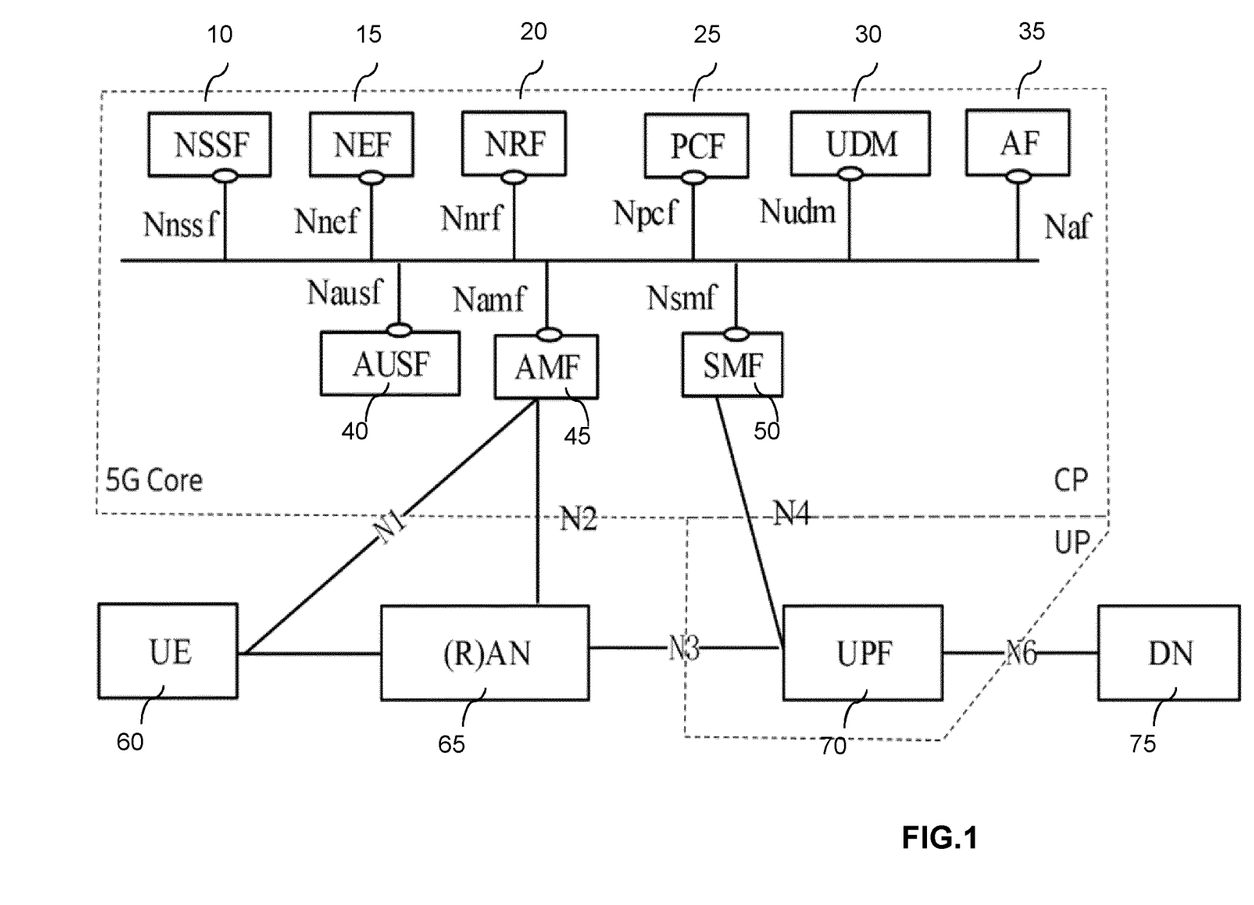
FIG. 1 shows an example schematic architectural view of a cellular network as known in the art showing the service-based architecture from a 5G network.

FIG. 1 shows a 5G New Radio, NR, architecture with service based interfaces in the Service Based Architecture (SBA). Service Based Interfaces are represented in the format Nxyz, such as Nsmf, and point to point interfaces in the format Nx, such as N4.

The 5G core network part comprises a Network Slice Selection Function (NSSF) 10, a Network Exposure Function (NEF) 15, a Network Repository Function (NRF) 20, a Policy Control Function (PCF) 25, a Unified Data Management (UDM) 30, an Application Function (AF) 35, an Authentication Server Function (AUSF) 40, an Access and Mobility Management Function (AMF) 45, and a Session Management Function (SMF) 50. Having service based interfaces in the 5G Core Control Plane (CP), implies that the Network Functions (NFs) in the 5G Core CP provide services that are consumed by other NFs in the 5G Core CP.

A User Equipment (UE) 60, is connected to the Radio Access Network (RAN) 65, wherein a User Plane Function (UPF) 70 is provided to connect the UE 60 to a Data Network (DN) 75.

SBA: In 5G core network architecture, the 'network elements' is made available through Application Programming Interfaces (APIs). These 'network elements', are defined as Network Functions (NFs), and the architecture where each NF offers one or more service to other NFs is called Service-Based Architecture, SBA.

In the following some of the functions/nodes are explained in more detail

NEF 15: Network Entity Function, can support external application to manage for specific Quality-of-Service (QoS) of session. It can be used by authorized application to request QoS for a session.

PCF 25: Policy Control Function, provides policy control for session management related functionalities. It interacts with AF, and SMF to conduct policy control for PDU sessions. Further, it can also provide policy to UE, for example, differentiate and treatment of different UEs.

UPF 70: User Plane Function, processes and forwards user date. The functionality is controlled by SMF. It interconnects with external IP network and perform as an anchor point connecting UE to the external network. It can apply Deep Packet Inspection (DPI) to user date, as input to policy decision of PCF, and execute the policies from PCF.

AF 35: Application Function, is a representation of application inside or outside the operator's network that interact with 3GPP network.

PDU session: Protocol Data Unit, provides UE with data connectivity towards a data network, which could be internet, operator specific network or a data network dedicate to, e.g. warehouse or factory.

SMF 50: Session Management Function, setups the connectivity to UE through data network, it communicates with UE through AMF.

In current Core Service-based architecture as shown in FIG. 1, the control plane and user plane are distinctly divided. The control plane has little knowledge on the third-party application service, interfaced through Application Function 35, communicate to UE 60 in the IP network level. For weight information for deep learning application, the transmitted weight through AF to UE could be compressed without destroying the user experience.

Compression Techniques

Different techniques exist to reduce the resolution of the weights which use standard rounding methods. Existing weights resolution from binary 64-bit can be reduced to: binary, 4-bit, 8-bit, 16-bit, 32-bit, 64-bit.

Figure 2:
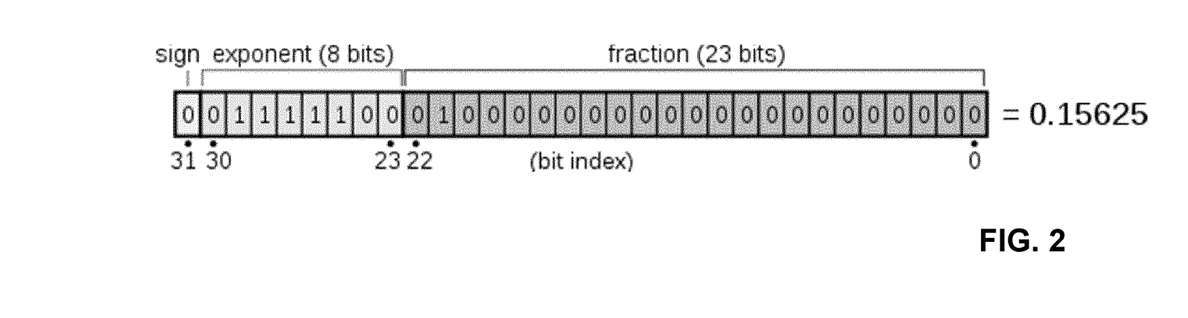
FIG. 2 shows an example schematic view of a representation of a floating-point number.

As sown in FIG. 2 using 16-bit as an example, the higher byte Byte1 is more important than the lower byte Byte2:

Resolution reduction procedure for floats is harder. Solution 1 is to min-max floats to integers then transfer them as integers. Solution 2 is for floats based on the fact that only some separations of bits are possible. The sign and exponent parts are always mandatory, while the fraction part can be separated according to the requirement.

The data transfer of the model to the user entity might slow down both training or inference processes.

The model inference is dependent on the device's (UE) processing capacity on which it is executing and can be affected by the limited processing capacity of the device (e.g. executing a model on a phone).

Further, from a cellular network perspective, UEs could have different channel capacity. This could be due to different reasons between transmitted weight and network capacity, e.g. channel capacity, UE in battery saving mode, etc. Moreover, the connection capacity could be different for different geographically locations that could affect UEs. Accordingly, the current 5G Core (5GC) may not be able to reach the most fitting balance of this tradeoff for every individual UE.

It is very costly to send this big amount of data over the network.

From the model aspect, the models are downloaded from model builder or application server (center sever) to edge/UE for each application such as a language for text recognition and each is about 20-30 MB. However, this (compressed) model is one-time downloaded.

Accordingly, a need exists to improve the download of a model to a mobile.

SUMMARY

This need is met by the features of the independent claims. Further aspects are described in the dependent claims.

According to a first aspect, a method for operating a policy control entity is provided in a cellular network, wherein a quality of service parameter is determined for a data packet session in which one trained model from a plurality of trained models is downloaded to a mobile entity. The plurality of trained models differ from one another by the data size and by a number of features used by the corresponding model to carry out a certain task. Furthermore, at least one capacity parameter of the mobile entity is determined describing a processing capacity of the mobile entity. In addition, a network transmission parameter of the cellular network is determined describing the transmission capabilities of the cellular network for transmitting the trained model. The one trained model is then determined from the plurality of different trained models based on a data set which maps different capacity parameters and transmission capabilities to the plurality of trained models, based on the determined capacity parameter and based on the network transmission parameter. Furthermore, routing information indicating where said one trained model is accessible for transmission to the mobile entity is determined and the routing information is transmitted to a session management entity configured to manage the data packet sessions in the cellular network.

Accordingly, it is not the entity providing the plurality of trained models that decides which of the trained models is downloaded to the mobile entity, but it is the network itself, here the policy control entity which at runtime determines based on the processing capacity, the network transmission parameter and the data set which of the models is used for a transfer to the mobile entity.

Furthermore, the corresponding policy control entity is provided comprising a memory and at least one processing unit, wherein the memory contains instructions executable by the at least one processing unit and the policy control entity is operative to work as discussed above or as discussed in further detail below. The policy control entity also determines the routing information indicating where said one trained model is stored and transmits this routing information, so that it becomes accessible at the end to the mobile entity which will download set one model, e.g. from an application server or application entity.

As an alternative, a policy control entity is provided comprising a first module configured to determine a quality of service parameter for a data packet session in which said one trained model is downloaded to the mobile entity. The trained model is selected from a plurality of trained models, wherein these models differ from one another by the data size and the number of features used by the model to carry out a certain task. A second module is provided configured to determine at least one capacity parameter of the mobile entity describing the processing capacity of the mobile entity. The policy control entity can comprise a third module configured to determine a network transmission parameter representative of the transmission capabilities of the cellular network for transmitting the trained model which was selected. Furthermore, a fourth module is provided configured to determine said one trained model based on the data set which maps the different capacity parameters and transmission capabilities to the plurality of trained model based on the determined capacity parameter and based on the network transmission parameter. The policy control entity comprises a fifth module configured to determine routing information indicating where said one trained model is accessible for transmission and the policy control entity can comprise the six module configured to transmit the routing information to a session management entity.

Furthermore, a method for operating a user plane entity is provided configured to handle the data packet session in the cellular network in which one trained model from a plurality of trained models is downloaded to the mobile entity. The plurality of different trained models differ from one another by a data size and a number of features used by the corresponding model to carry out a certain task. The method comprises the step of receiving a handling request to handle the data packet session for transmitting said one trained model to the mobile entity, wherein the request comprises routing information where said one trained model is accessible at an application entity for a transmission to the mobile entity. Furthermore, a download request is received from the mobile entity requesting transmission of said one trained model to the mobile entity and a second request is transmitted to the application entity requesting transmission of said one trained model based on the received routing information.

The user plane entity receives the information where said one model can be downloaded. This information is then transmitted to the application entity which can then use this information to transmit the selected model to the mobile entity. As the application entity or application server does not determine anymore which of the models is used at the mobile entity, the user plane entity informs the application entity which model should be downloaded to the mobile entity.

Furthermore, the corresponding user plane entity is provided comprising a memory and at least one processing unit, wherein the memory contains instructions executable by the at least one processing unit. The user plane entity is operative to work as discussed above or as discussed in further detail below.

As an alternative, a user plane entity is provided comprising a first module configured to receive the handling request to handle the data packet session for transmitting said one trained model to the mobile entity, wherein this handling request comprises routing information where said one trained model is accessible for the transmission to the mobile entity. A second module is configured to receive a download request from the mobile entity requesting transmission of said one trained model to the mobile entity and a third module is configured to transmit a further request to the application server or application entity requesting transmission of said one trained model based on the received routing information.

Additionally, a system is provided comprising the user plane entity and the policy control entity as discussed above.

Furthermore, a computer program comprising program code is provided, wherein execution of the program code causes the at least one processing unit of the user plane entity or the policy control entity to execute a method as mentioned above or as explained in further detail below.

Finally, a carrier comprising the computer program is provided, wherein the carrier is one of an electronic signal, optical signal, radio signal, or computer readable storage medium.

Other devices, systems, methods, features and advantages will be or will become apparent to one with skill in the art upon examination of the following detailed description and figures. It is to be understood that the features mentioned above for features yet to be explained below can be used not only in the respective combinations indicated, but also in other combinations or in isolation without departing from the scope of the invention. Features of the above-mentioned aspects and embodiments described below may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION OF EMBODIMENTS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function in general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Within the context of the present application, the term "mobile entity" or "user equipment/UE" refers to a device for instance used by a user for his or her personal communication. It can be a telephone type of device, cellular telephone, mobile station, cordless phone or personal digital assistant type of device like laptop, notebook, notepad or tablet equipped with a wireless data connection. It can also be an embedded device like a microcontroller inside a vehicle etc. The UE may also be associated with nonhumans like animals, plants or machines. The UE may be equipped with a subscriber identity module, SIM, comprising unique identities associated with the user using the UE. The presence of the SIM within a UE customizes the UE uniquely with a subscriber of the user.

As will be explained below, the transfer of the model and of the model weights is improved by progressively transferring feature data of a model and the model weights by setting different resolutions that are adapted according to the network channel capacity and the capacity of the mobile entity receiving the model. By way of example, integers can be transferred without conversion or compression by transferring selected bits directly.

An operating scenario for the present application is as follows:

A trained model should be downloaded to a mobile entity, UE, such as UE60 shown in FIG. 1 in order to carry out a certain task at the UE such as an identification of a traffic sign, an identification of text provided on a traffic sign or anywhere else, any translation of text at the mobile entity. The task can further include a simple calculation or prediction of how a certain relationship will evolve in the future. By way of example, the task may be to predict the prices for a certain good or real estate. The trained model should, by way of example, predict the future prices of real estate based on different features, wherein the feature can include parameters such as the size of the real estate, the location within a certain area, whether the real estate is furnished are not, the number of rooms etc. All these different features are weighted by weights. The task that should be performed is carried out by a trained model using deep learning technologies such as neural networks. Based on the complexity of the task and based on the available resources in the cellular network through which the trained model is downloaded to the UE, the size of the trained model can vary considerably. An application server, also called application entity hereinafter, provides different kinds of trained models, wherein these models differ from one another by the fact that they differ in data size and/or a number of features that are used to carry out the task. For the price prediction of real estate, a simple model may only use the number of rooms, a more sophisticated model may use other features, too.

As will be explained below, the network now decides which of the trained models is selected for the download to the UE, the network owns the authorization to dynamically decide the resolution of the model and the features used and the resolution of the weights used in the model depending on the channel capacity, the capacity of the mobile entity at that time.

The application discussed below comprises three main parts:

The first part in which a data set is created which describes the importance level and the transfer level mappings. This data set is also called IT map hereinafter. The data set is a predefined data set which describes based on the importance level of a feature of a model, based on the network status and based on the UE capacity how the data of the model is transmitted to the UE, especially whether it is transmitted without compression or with which level of compression. The data set is determined in advance and stored in the network such as the policy control entity in the form of rules or policies. The data set can be dynamically adapted or may be fixed.

This data set is then shared in a bootstrapping phase. A communication protocol between the application servers providing the different trained models and the cellular network is used, and the data set is then stored in the policy control function, PCF, or policy control entity in the form of rules or policies.

At runtime, a suitable model is selected using the data set, the transport status of the cellular network and the capacity or capability of the UE, in order to exchange PDU session information and a UE capacity. The result is the selection of one of a plurality of trained models for a deep learning application carried out at the UE. The selection of the trained model decides how many features and at which compression rate the data are transmitted to the UE.

It is possible to first identify and recognize the most important parts or features of the model and used by the model and to use this knowledge to transfer the most or more important parts or features of the model with a lower compression or a higher resolution compared to features or parts of the model having a lower importance. Furthermore, during inference, it is possible, while transferring the models, that the more important weights used in the model may be transferred with a higher resolution such as 32- or 64-bits, whereas the less important weights or features are transferred with a lower resolution such as 8- or 16-bits, 4-bits or even binary.

For integers, the resolution sending is easier as only the important bytes or bits may be sent, and the receiving side, the UE could reconstruct the integer by simply filling the rest of the bytes or bits with zeros. When transferring the weights or the features, there is a predefined way to match the order of transmission with the ones that are transmitted. An importance level may be assigned to each feature for the data transfer and for each weight for the model transfer. An importance level can define the total number of digits in a value and how many of them should be transmitted when a specific transfer level is specified. The min-max scaler of integers can be used to reduce the amount of rules that are needed, though it increases the predefined meta information used in the IT map. The transmission procedure for floats is more complex. One solution is to min-max float to integers and then transmit them as integers. Another solution is based on the separation of the bits. The sign and the exponent parts of a float may be more important or mandatory, while the fraction part may be separated according to the specified importance level and separate parts maybe transferred according to the importance level.

Figure 3:
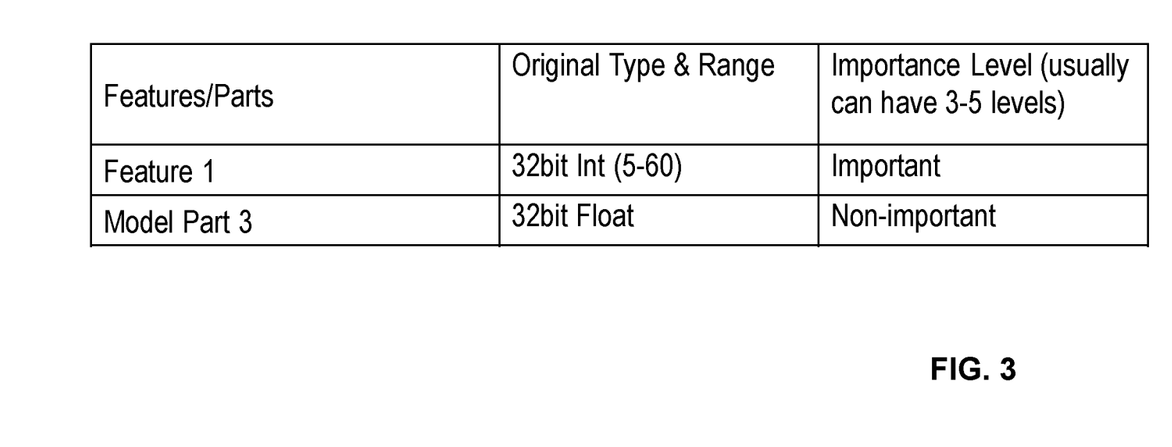
FIG. 3 shows a table indicating how different features of a model have different importance levels and how the different features of the model are coded in data size.

FIG. 3 shows a part of how different features of a model can be separated according to their importance, wherein it is additionally specified how the different features are normally transmitted or coded in bytes or bits.

Figure 4:
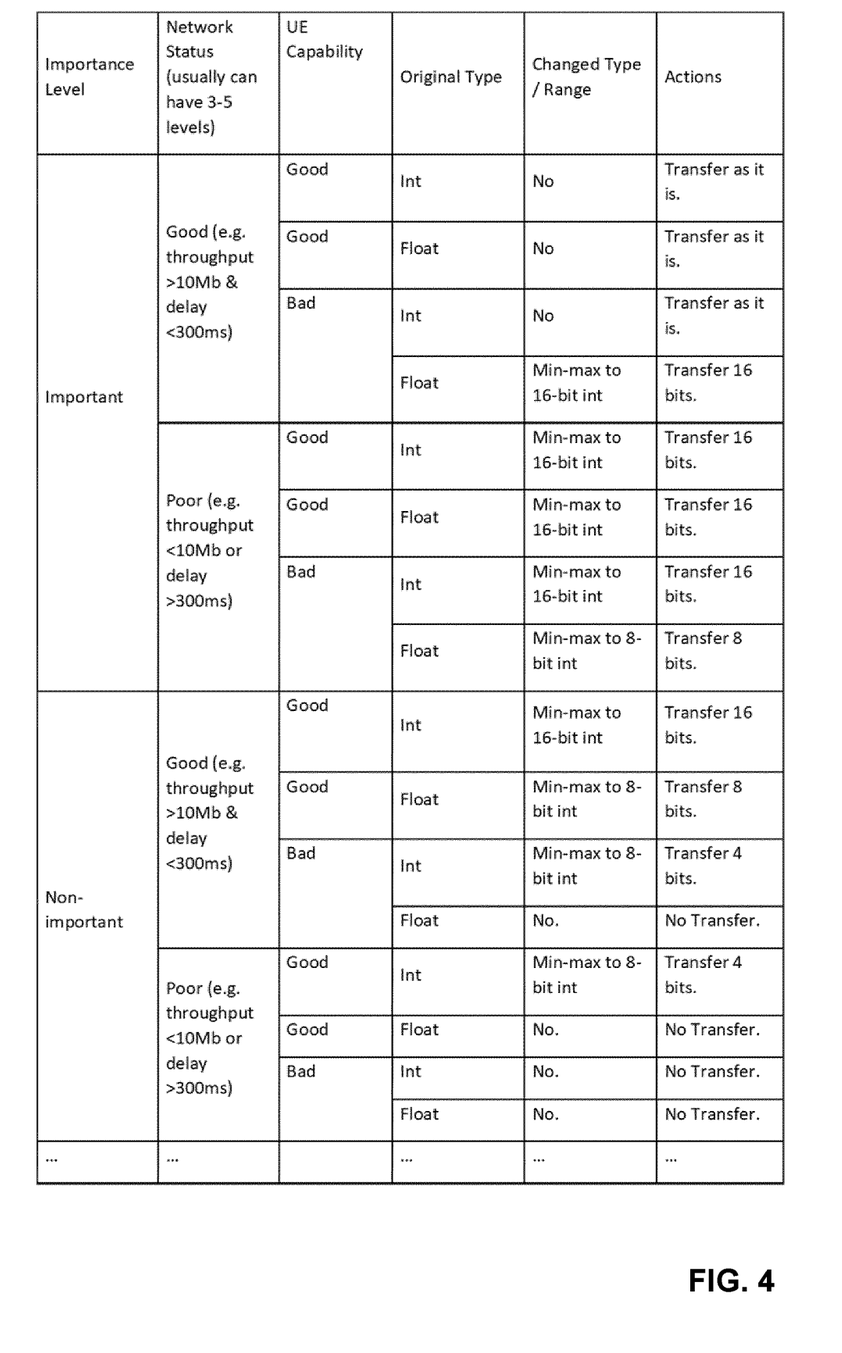
FIG. 4 shows an example schematic view of a dataset which is used by a policy control entity to determine which of different trained models are used, wherein the data set indicates how different features of a model should be transmitted based on the capacity parameter or the network status and especially indicates the compression factor used to transmit different features of the model.

FIG. 4 shows an example of a data set or IT map, which indicates how the different parts of features of a model are transmitted based on the importance level, the network status and the UE capacity or capability.

As shown in FIG. 4, a feature having a high important level may be transferred as it is without compression if the network status is acceptable and if the capability of the UE is also acceptable or good. The UE capability can include the processing capacity, the battery status of the UE, etc. As shown in FIG. 4, based on different importance levels, the different transmission capacities of network and the UE capacities, the data set indicates how and with which compression the different data is transmitted. The different trained models may be stored in the application server such that the different models differ from one another by the size of the data describing the model and the features used in the model to carry out the task. When the importance level of the different model component is known, the network status is known and the UE capacities, one from the plurality of models may be selected which has a data size such that it can be transmitted to the UE in the required timeframe. Accordingly, the different combinations given in the data set shown in FIG. 4 and as determined form the currently determined parameter may each lead to the selection of certain model having a defined data size.

In the following, the bootstrapping phase is discussed in more detail.

Figure 5:
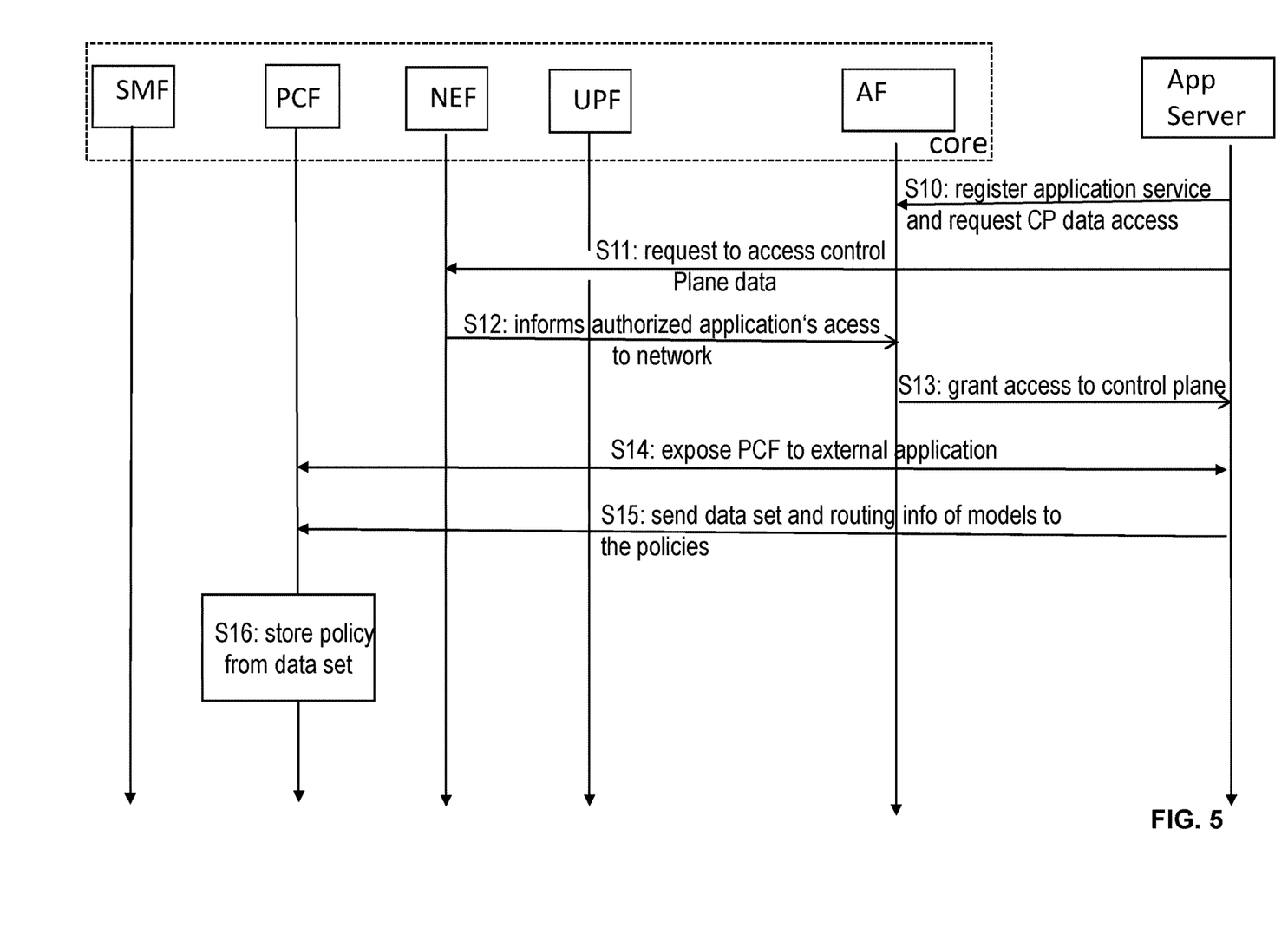
FIG. 5 shows an example schematic view of a message exchange between the involved entities for providing the policy control entity with the data set shown in FIG. 4.

FIG. 5 shows a message exchange between the involved entities in order to distribute the IT map shown in FIG. 4. In the first step S10, the application service is registered in the network to get access to the PCF node. Furthermore, the application server requests access to the control plane data.

In step S11, a request to access the control plane data is sent to the Network Exposure Function NEF, which, in step S12, informs the authorized application function of the access to the cellular network, so that, in step S13, the fact that access is granted to the control plane is transmitted to the application server. In step S14, AF grants the application server access to the central plane and the PCF is exposed to the external application server, so that, in step S15, the data set is transmitted to the PCF. In addition to the data set or IT map, routing information is transmitted to the PCF indicating where the different compressed models can be accessed, including e.g., the application server IP address, a port number and the directory where each of the models can be accessed at the application server. In step S16, the PCF stores the IT map and the routing information. The PCF can store the IT map as its policy along with the routing information about where to access the different models using address information such as the IP address of the application server, the port number and any directory where the model and different models are stored.

FIG. 5 illustrates the service bootstrapping phase when a new service vendor registers itself to the cellular network and transmits the IT map and routing information into the network policy. The IT map and routing is customized according to the required data for the service.

The application servers like Facebook are required to authorize themselves through the application function using the NEF as shown in FIG. 5. If the application servers can directly access the cellular network and the core components, then the bootstrapping phase could directly start with step S14 without requiring to access to the NEF first.

Figure 6:
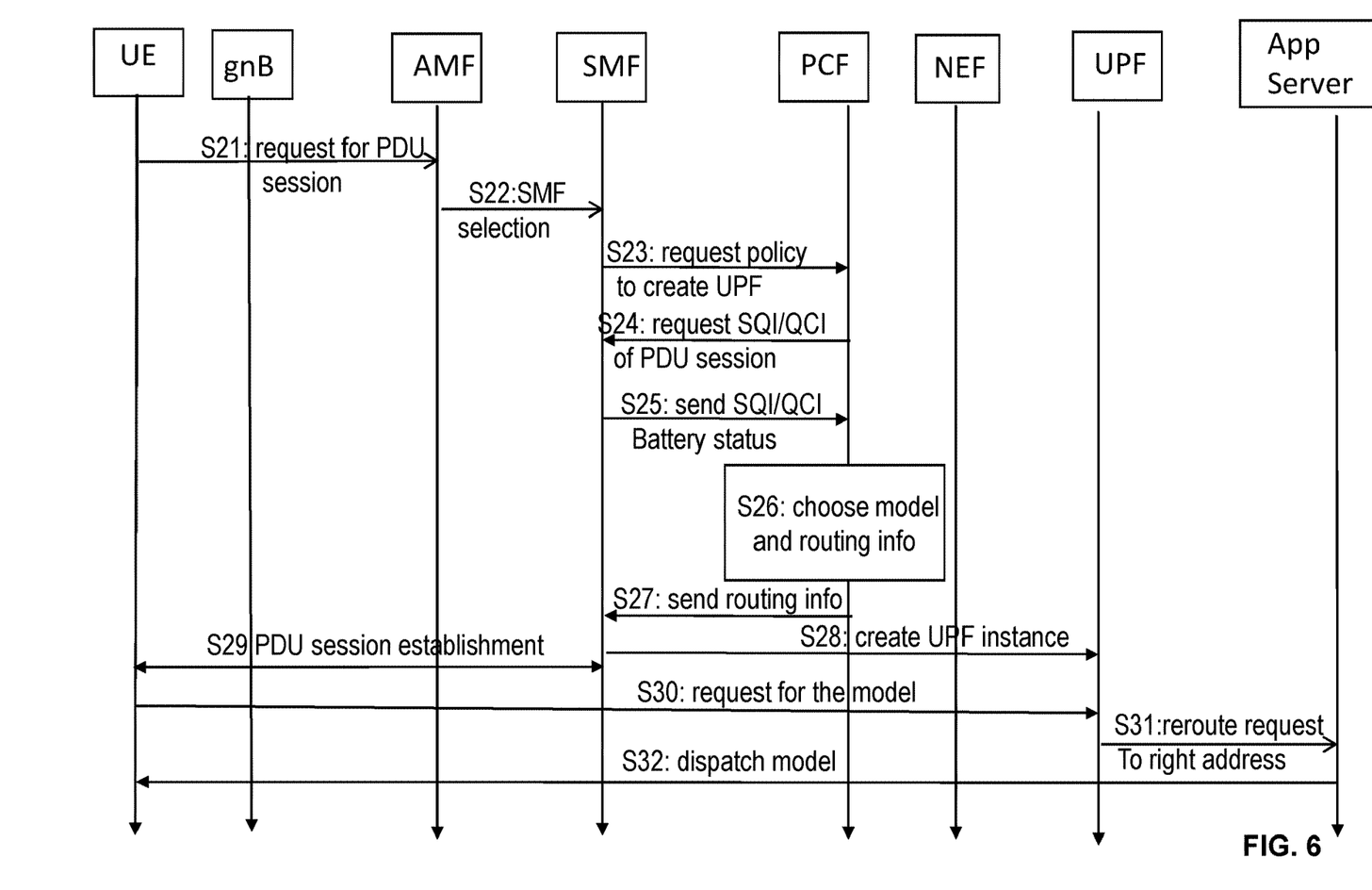
FIG. 6 shows an example schematic view of a message exchange between the involved entities how the network decides which model is used for a download to the mobile entity in a situation where one of the plurality of trained models is downloaded to a user.

FIG. 6 describes the use of the service at runtime where the service application is triggered and the respective PDU session or call flow is initialized in an existing PDU. The policies are applied dynamically at runtime according to the application holding the UE capability, the network environment key performance indicators, KPI, and the IT map.

In step S21, a request is sent from the UE to the AMF to establish a PDU session. The PDU session establishment request is made by the UE for a data exchange between the access network, AN, and the core network. The request can include quality of service parameter such as the QoS class identifier, QCI, (4G/LTE) or 5QI (in 5G) requirements like latency throughput or other network parameters, and can furthermore include the UE capacity like the processing and storing capacity, the battery status, etc. In step S22, the AMF selects the SMF and transmits the parameters it has received from the UE. In the core network, the SMF is responsible to request the policy information, network slice instance and UPF selection for the application, so that the UE is able to communicate with the application server which may be provided in the cloud. In step S23, the SMF request the policy information needed to create the UPF instance. Here, the SMF requests the PCF node to receive the policy information that is needed to create UPF. In step S24, the PCF requests the quality of service parameters, the UE capabilities with the battery status from the SMF. This information is needed in order to choose a suitable policy according to the current capacity parameter of the UE and the network status. In step S25, the SMF transmits the request information including the quality of service parameter, the UE capability, the battery status, etc. to the PCF. In step S26, the PCF chooses a suitable policy at runtime based on the received quality of service parameters the UE capacity using the IT map. Furthermore, it also receives the routing information about the application server with the address including e.g. a port number and directory for the chosen policy. Accordingly, in step S26, the PCF selects one of the models from the plurality of models provided on the application server. In step S27, the PCF sends the routing information such as the IP port and the directory using a particular template, so that the session management function is informed where the selected model is stored at the application server. In steps S28, the SMF creates the UPF instance according to the received template for the user plane traffic. It also sends the routing information to the application server where the models are stored and where the chosen model can be found to the UPF. Accordingly, in step S28, the information where the selected model can be accessed at the application server is transmitted to the user plane entity handling the traffic. In step S29, a PDU session is established between the UE entity and SMF for the application, e.g. using an Nsmf-PDU session service. In step S30, the UE sends a request for the model to the UPF to download the model and the corresponding weights through the user plane session. In step S31, the UPF reroutes the request to the correct address at the application server, by way of example using the information as received from the SMF in step S28. Finally, in step S32, the application server sends the required selected model to the UE.

Figure 7:
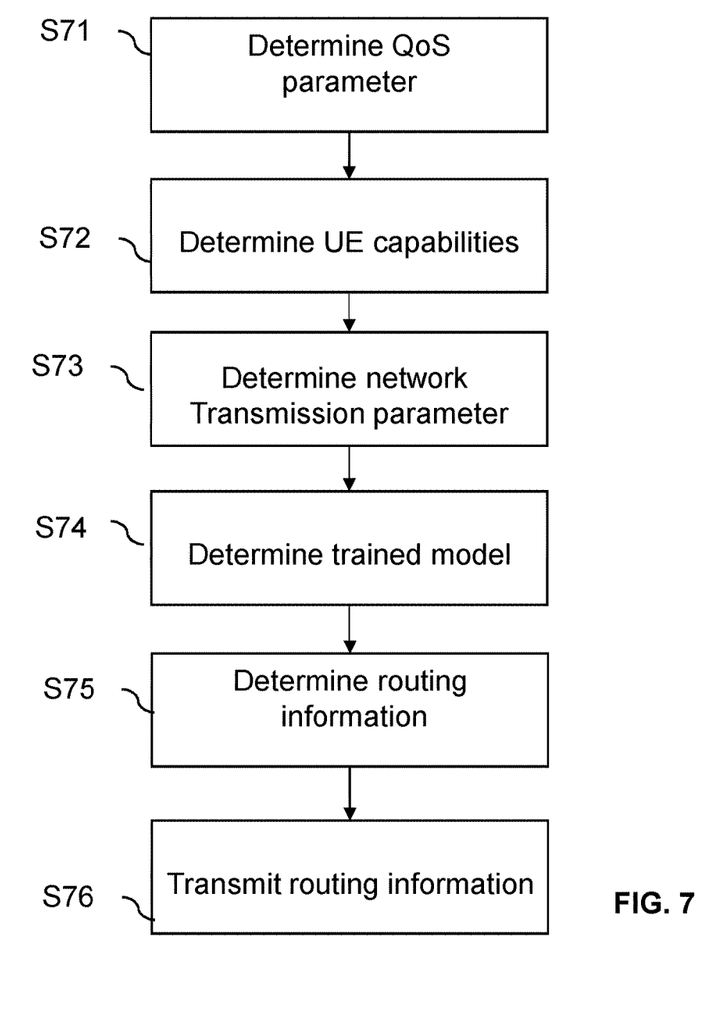
FIG. 7 shows an example flowchart of a method carried out at the policy control entity in a situation discussed in FIG. 6.

FIG. 7 summarizes some of the steps carried out at the policy control entity, PCF, in the embodiment shown in FIG.

6. In the first step, S71, the policy control entity determines a quality of service parameter for the data packet session through which one of the models should be downloaded from the application server to the UE. As discussed above in connection with FIG. 6 in steps S24 and S25, the PCF may request the quality of service parameters from the SMF. Furthermore, in step S72, the policy control entity determines the UE capacity including the UE capabilities, the battery status, etc. Furthermore, a network transmission parameter is determined describing the transmission capabilities of the cellular network available for the transmission of the model (S73). This information may be derived from the quality of service parameters which the UE has transmitted in step S21 and which the SMF transmits to the PCF in step S25. In step S74, the policy control entity then determines which from the plurality of trained models are used based on the determined pieces of information which were determined in step S71 to S73. When the quality of service parameters, the UE capacity and the network transition parameters are known, it is possible to determine at which compression level the different parts of a model can be transmitted. The overall data size to be transmitted can be determined, and based on this information it is possible to select one of the models, wherein the selected model has a defined compression rate for the different features and weights. The determination of the model was discussed in FIG. 6 in connection with step S26. Furthermore, in step S75, the routing information is determined which indicates where the selected model can be accessed at the application server. This was also discussed above in connection with step S26. Furthermore, in step S76, the routing information is transmitted to the session management function, SMF, as discussed above in connection with step S27.

Figure 8:
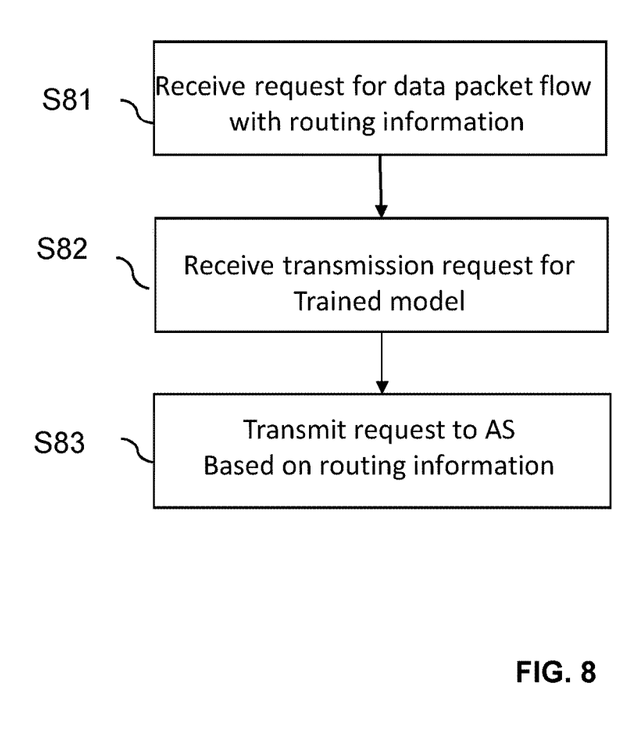
FIG. 8 shows an example flowchart of a method carried out at the user plane entity in a situation discussed in FIG. 6.

As far as the UPF or user plane entity is concerned, some of the steps carried out in the message exchange in FIG. 6 are discussed in connection with FIG. 8. In step S81, the user plane entity receives the request for a data packet flow including routing information as mentioned above in connection with step S28. Furthermore, it receives the request for a trained model in step S82, wherein this request was received from the UE as mentioned above in step S30. In step S83, the request is transmitted to the application server based on the routing information. The request received from the UE is rerouted to the correct address of the application server, wherein the request includes information of the model, a feature list and the model parts that should be transmitted.

Figure 9:
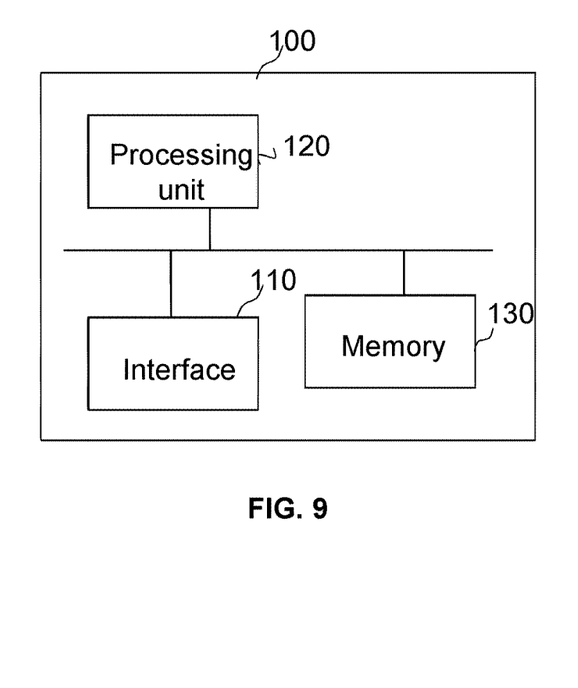
FIG. 9 shows an example schematic representation of a policy control entity configured to determine one trained model from a plurality of trained models which is transmitted to the mobile entity for carrying out a certain task.

FIG. 9 shows a schematic architectural view of the policy control entity which can carry out the above discussed selection of the model. The policy control entity 100 comprises an interface or input-output 110 which is provided for transmitting user data or control messages to other entities such as the entities discussed in connection with FIG. 5 and FIG. 6. The interface may be qualified to receive the quality of service parameters and may be configured to transmit the needed routing information. The policy control entity furthermore comprises a processing unit 120 which is responsible for the operation of the policy control entity 100. The processing unit 120 can comprise one or more processors and can carry out instructions stored on a memory 130, wherein the memory may include a read-only memory, a random access memory, a mass storage, a hard disk or the like. The memory 130 can furthermore include suitable program code to be executed by the processing unit 120 so as to implement the above described functionalities in which the policy control entity is involved.

Figure 10:
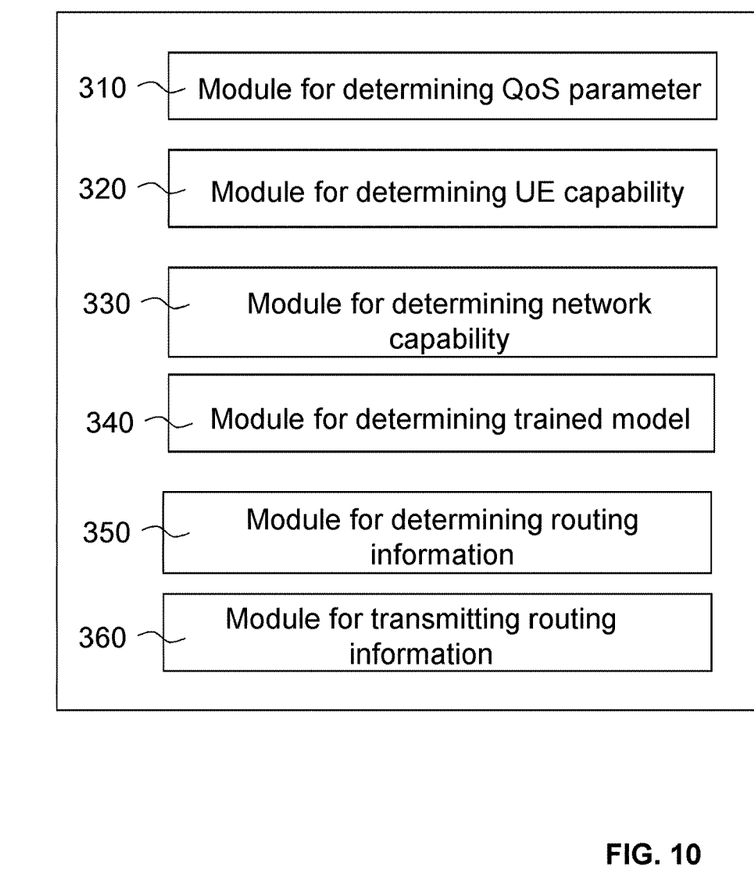
FIG. 10 shows another example schematic representation of the policy control entity configured to determine one trained model from a plurality of trained models which is transmitted to the mobile entity for carrying out a certain task.

FIG. 10 shows another schematic architectural view of a policy control entity comprising a first module configured to determine the quality of service parameters. The policy control entity can comprise a second module 320 configured to determine the UE capacity including the UE capabilities and the battery status. A module 330 is configured to determine the network transmission capabilities, by way of example a network transmission parameter based on information received from the UE. Furthermore, module 340 is configured to determine one of the trained models from the plurality of models based on the received information and module 350 can furthermore determine the routing information including the information where at the application server the selected model can be found. Finally, module 360 is provided and configured to transmit the routing information to other network components such as the SMF shown in FIG. 6.

Figure 11:
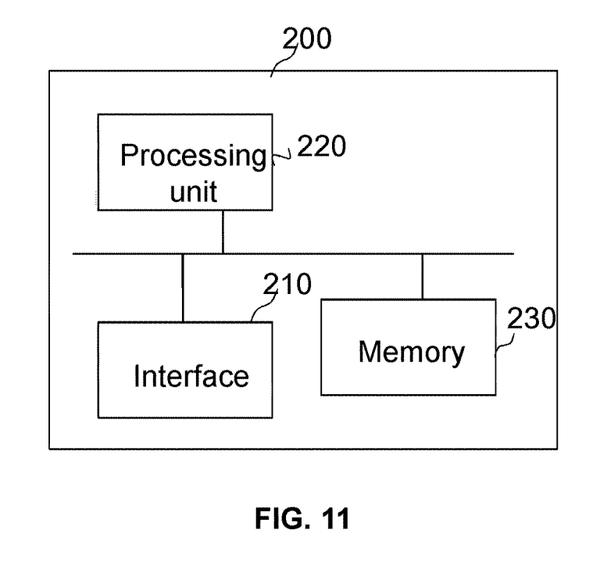
FIG. 11 shows an example schematic representation of a user plane entity configured to handle the data packet session for transmitting the trained model in the situation as shown in FIG. 6.

FIG. 11 shows an example schematic view of a user plane entity 200 which can carry out the above discussed handling of the transmission of the selected model. The user plane entity comprises an interface or input-output 210 configured to transmit user data or control messages and configured to receive user data or control messages. The user plane entity furthermore comprises a processing unit 220 which is responsible for the operation of the user plane entity 200. The processing unit 220 comprises one or more processors and can carry out instructions stored on a memory 230, wherein the memory may include a read-only memory, a random access memory, a mass storage, a hard disk or the like. The memory can furthermore include suitable program code to be executed by the processing unit 220 so as to implement the above-described functionalities in which the user plane entity is involved.

Figure 12:
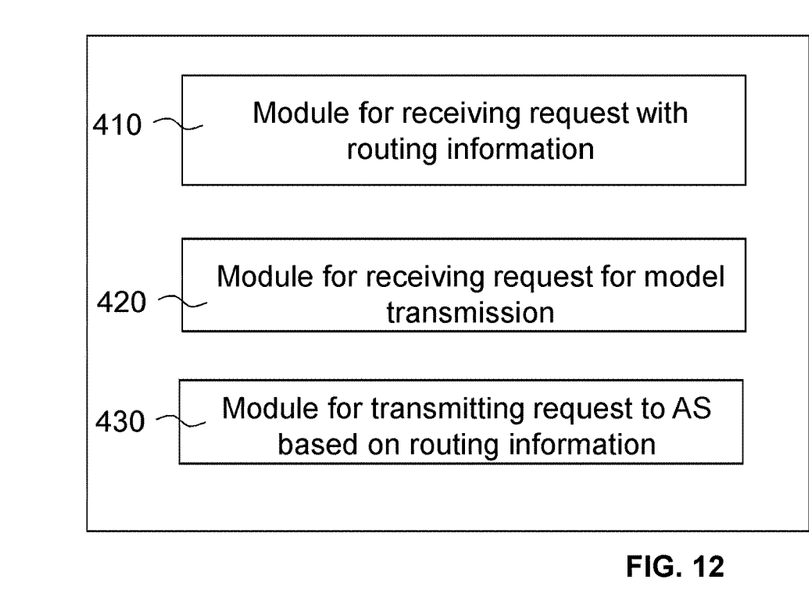
FIG. 12 shows another example schematic representation of a user plane entity configured to handle the data packet session for transmitting the trained model in the situation as shown in FIG. 6.

FIG. 12 shows another example schematic view of a user plan entity 400. The user plane entity 400 comprises a first module 410 configured to receive the request including the routing information where the trained model is accessible for transmission at the application server. Furthermore, the entity 400 comprises a second module 420 configured to receive the download request from the mobile entity requesting a transmission of the trained model to the mobile entity. The user plane entity comprises a third module 330 configured to transmit a request to the location server requesting the transmission of the trained model, wherein the request is transmitted to the application server based on the received routing information.

From the above, said some general conclusions can be drawn.

As far as the policy control entity is concerned, when the quality of service parameter is determined by the policy control entity, it is possible to transmit a first request to the session management entity requesting the quality of service parameter and the capacity parameter from the session management entity. Furthermore, a response is received to this request from the session management entity and the response comprises the quality of service parameter and capacity parameter. This was discussed above in connection with steps S24 and S25.

When the routing information is determined, it is possible to determine an address information at the application entity at which said one trained model can be accessed for the download to the mobile entity. The address information may comprise an IP address or a port number where the model can be accessed at the application server. The plurality of different trained models may differ from one another by the number of features and amount of compression of the features with which the corresponding features of the plurality of trained models are transmitted through the cellular network.

The database or IT map may indicate the compression parameter in dependence on the network transmission parameter and the capacity parameter of the mobile entity. It is possible to give in at least some of the plurality of trained models different importance levels to the different features and the data set or IT map indicates that features with a higher importance level are to be transmitted to the mobile entity with a lower compression compared to the features with a lower importance level. Furthermore, it is possible that, in each of the models, the features are weighted with a corresponding rating factor and the data set furthermore indicates the compression for the weighting factors in dependence on the capacity parameter and/or in dependence on the transmission capabilities.

Furthermore, in a bootstrapping phase, before the trained model is determined, the defined data set is received and stored by the policy control entity such that it is accessible to the policy control entity.

As discussed in connection with FIG. 5, the application server may transmit the IT map to the PCF where, based on this, policies are stored. The data set can be received from the application entity providing the plurality of trained models and the routing information can be additionally received from the application entity where each of the different models is accessible at the application entity.

As far as the user plane entity is concerned, the handling request may be received from the session management entity and includes as routing information, the network address and a directory where the trained model which was elected is accessible at the application entity.

The above-discussed solution has several advantages.

One advantage is that the model will be available for inference within a shorter time. In case the mobile entity running the model is not very fast and the use case requires real-time data, it might be advantageous to run a simpler model. With less data, the data transfer and feature extraction will be probably faster and the model itself might also be able to do the inference faster.

Especially, a training of the model might gain from this, since the amount of data needed for training might be large and the data transport time high when the training is carried out at the UE, however the training may also be done at the server. A training could take hours or days on large amounts of data. The training could be faster when small amount of data are used when the training is occurring at the UE. During use, the transmission of the most important resolution bytes of the model might help to reduce the data size to be transmitted. When the capacity allows, more data could be sent and used accordingly.

The application could also be applied for assisting individual UEs having fitted deep learning models according to its own capabilities without deploying models for different UEs with no network awareness. The decision of the deploying model accuracy could be migrated into the network other than the application or cloud server. The application is furthermore suitable for UEs with varying computing capability, or when running in a battery saving mode or when multiple applications are running concurrently.

The invention claimed is:

1. A method for operating a policy control entity in a cellular network, the method comprising:
   determining a quality-of-service (QoS) parameter for a data packet session in which one trained model from a plurality of trained models is downloaded to a mobile entity, wherein the plurality of trained models differ from one another by a data size and a number of features used by the trained model to carry out a certain task;
determining at least one capacity parameter of the mobile entity describing a processing capacity of the mobile entity;
determining a network transmission parameter of the cellular network describing transmission capabilities of the cellular network for transmitting the one trained model;
determining the one trained model from the plurality of trained models based on a dataset which maps different capacity parameters and transmission capabilities to the plurality of trained models, on the determined capacity parameter, and on the network transmission parameter;
determining routing information indicating where the one trained model is accessible for a transmission to the mobile entity; and
transmitting the routing information to a session management entity configured to manage the data packet session in the cellular network;
wherein the plurality of trained models differs from one another by the number of features and by an amount of compression of the features with which the corresponding features of the plurality of trained models are transmitted through the cellular network;
wherein the dataset indicates a compression parameter in dependence on the network transmission parameter and the capacity parameter;
wherein different importance levels in at least some of the plurality of trained models are given to the different features; and
wherein the dataset indicates that features with a higher importance level are to be transmitted to the mobile entity with a lower compression compared to the features with a lower importance level.

2. The method according to claim 1, wherein determining the QoS parameter and capacity parameter comprises:
transmitting a first request to the session management entity requesting the QoS parameter and the capacity parameter from the session management entity; and
receiving a response to the first request from the session management entity, the response comprising the QoS parameter and the capacity parameter.

3. The method according to claim 1, wherein determining the routing information comprises determining address information at an application entity at which the one trained model can be accessed for a download to the mobile entity.

4. The method according to claim 1, wherein:
in each of the plurality of trained models, the features are weighted with a corresponding weighting factor; and
the dataset indicates the compression for the weighting factors in dependence on the capacity parameter and/or the transmission capabilities.

5. The method according to claim 1, wherein in a bootstrapping phase, before the one trained model is determined, the dataset is received and stored by the policy control entity such that the dataset is accessible to the policy control entity.

6. The method according to claim 5, wherein:
the dataset is received from an application entity providing the plurality of trained models;
the routing information is additionally received from the application entity; and
each of the plurality of trained models is accessible at the application entity.

7. A policy control entity comprising a memory and at least one processing circuit, the memory containing instructions executable by the at least one processing circuit, wherein the policy control entity is configured to:
determine a quality-of-service (QoS) parameter for a data packet session in which one trained model from a plurality of trained models is downloaded to a mobile entity, wherein the plurality of trained models differ from one another by a data size and a number of features used by the trained model to carry out a certain task;
determine at least one capacity parameter of the mobile entity describing a processing capacity of the mobile entity;
determine a network transmission parameter of a cellular network describing transmission capabilities of the cellular network for transmitting the one trained model;
determine the one trained model from the plurality of trained models based on a dataset which maps different capacity parameters and transmission capabilities to the plurality of trained models, on the determined capacity parameter, and on the network transmission parameter;
determine routing information indicating where the one trained model is accessible for a transmission to the mobile entity; and
transmit the routing information to a session management entity configured to manage the data packet session in the cellular network;
wherein the plurality of trained models differs from one another by the number of features and by an amount of compression of the features with which the corresponding features of the plurality of trained models are transmitted through the cellular network;
wherein the dataset indicates a compression parameter in dependence on the network transmission parameter and the capacity parameter;
wherein different importance levels in at least some of the plurality of trained models are associated with different features; and
wherein the dataset indicates that features with a higher importance level are to be transmitted to the mobile entity with a lower compression compared to the features with a lower importance level.

8. The policy control entity according to claim 7, wherein to determine the QoS parameter and capacity parameter, the policy control entity is further operative to:
transmit a first request to the session management entity requesting the QoS parameter and the capacity parameter from the session management entity; and
receive a response to the first request from the session management entity, the response comprising the QoS parameter and the capacity parameter.

9. The policy control entity according to claim 7, wherein to determine the routing information, the policy control entity is operative to determine an address information at an application entity at which the one trained model can be accessed for a download to the mobile entity.

10. The policy control entity according to claim 7, wherein:
in each of the trained models, the features are weighted with a corresponding weighting factor; and
the dataset indicates the compression for the weighting factors in dependence on the capacity parameter and/or the transmission capabilities.

11. The policy control entity according to claim 7, wherein in a bootstrapping phase, before the one trained model is determined, the policy control entity is operative to receive the dataset and to store the dataset such that it is accessible to the policy control entity.

12. The policy control entity according to claim 11, further configured to:
   receive the dataset from an application entity providing the plurality of trained models; and
   receive the routing information from the application entity, where each of the plurality of trained models is accessible at the application entity.

\* \* \* \* \*